United States Patent [19]

Wood

[11] 3,839,650

[45] Oct. 1, 1974

[54] SIGNAL PROCESSORS FOR FILTERING APPLIED SIGNALS

[75] Inventor: Richard D. Wood, Venice, Calif.

[73] Assignee: Hughes Aircraft Company, Culver City, Calif.

[22] Filed: June 25, 1973

[21] Appl. No.: 373,048

[52] U.S. Cl. .................... 307/246, 328/73, 328/127, 328/151, 307/233 A, 307/251

[51] Int. Cl. .................... H03k 17/60

[58] Field of Search ............. 328/73, 151, 167, 127; 307/235, 241, 233 A, 246, 251

[56] References Cited

UNITED STATES PATENTS

| | | | |
|---|---|---|---|
| 3,430,072 | 2/1969 | Stevens | 328/151 X |
| 3,474,259 | 10/1969 | Rodgers | 328/151 X |
| 3,479,534 | 11/1969 | Miller | 307/235 |
| 3,480,795 | 11/1969 | Benson et al. | 307/235 |
| 3,753,132 | 8/1973 | Hill | 328/151 |

OTHER PUBLICATIONS

IBM Tech. Disc., "Peak Picking and Noise Supression Circuitry," by Bjorkman et al., pp. 588, 589, Vol. 9, No. 6, 11/1966.

Electronics, "Signal is Sampled," by Deperna, May, 1967, pp. 71–72.

Electronics Products Mag., "Applications for Fast Slewing of Amps," by Hearn, pp. 54–55, June 21, 1971.

*Primary Examiner*—John S. Heyman
*Attorney, Agent, or Firm*—W. H. MacAllister; Lawrence V. Link, Jr.

[57] ABSTRACT

The signal processor disclosed herein provides an output signal which is a filtered reproduction of an applied input signal; and includes a first circuit for forming the difference between the applied signal and the output signal, a second circuit for periodically sampling and storing the value of this difference, and a third circuit for integrating the sampled and stored difference value to produce the output signal.

4 Claims, 5 Drawing Figures

SIGNAL PROCESSORS FOR FILTERING APPLIED SIGNALS

The invention herein described was made in the course of or under a contract or subcontract thereunder, with the Department of the Air Force.

BACKGROUND OF THE INVENTION

This invention relates generally to signal processors for filtering an applied signal, and particularly to such processors for filtering quantized signals of the type produced by digital to analog converter units.

In certain applications it is desirable to create a continuous (no abrupt transitions) analog signal by filtering a sequence of pulses having amplitude values corresponding to discrete sampled values of the analog signal. For example in display systems the deflection and/or intensity signals may be derived from the output signals of a digital computer by means of a digital to analog converter, and filtering or smoothing of the converter's output signals is desirable to avoid granularity in the display presentation. Numerous other examples, of such applications are to be found in the technological fields of data decoders, digital waveform generators and digital symbol generators. In some applications the required filtering may be implemented by means of prior art filters, however, for other applications the following error (reproduction accuracy) and/or the complexity of prior art filters is unacceptably large.

SUMMARY OF THE INVENTION

It is therefore an object of the subject invention to provide an improved signal processor for filtering applied signals.

Another object is to provide an improved signal processor for converting the abrupt (step) transitions within a signal comprised of a plurality of quantized segments into smoothed ramp type transitions.

A further object is to provide an improved signal processor for processing signals, of the type produced by digital to analog converters, so as to filter the signals and to reduce noise signals created by digital state transitions.

Signal processors in accordance with the subject invention provide an output signal which is a filtered reproduction of an applied input signal, and according to one preferred embodiment thereof a differential amplifier is employed to form a signal representative of the difference between the applied signal and the output signal; and a sample and hold circuit periodically samples this difference signal to produce a sampled difference signal which is integrated to provide the filtered output signal.

BRIEF DESCRIPTION OF THE DRAWINGS

The novel features which are characteristic of the invention both as to its organization and method of operation, together with further objects and advantages thereof, will be better understood from the following description considered in connection with the accompanying drawings in which like characters refer to like parts and in which.

DESCRIPTION OF THE PREFERRED EMBODIMENTS

Figure 1:
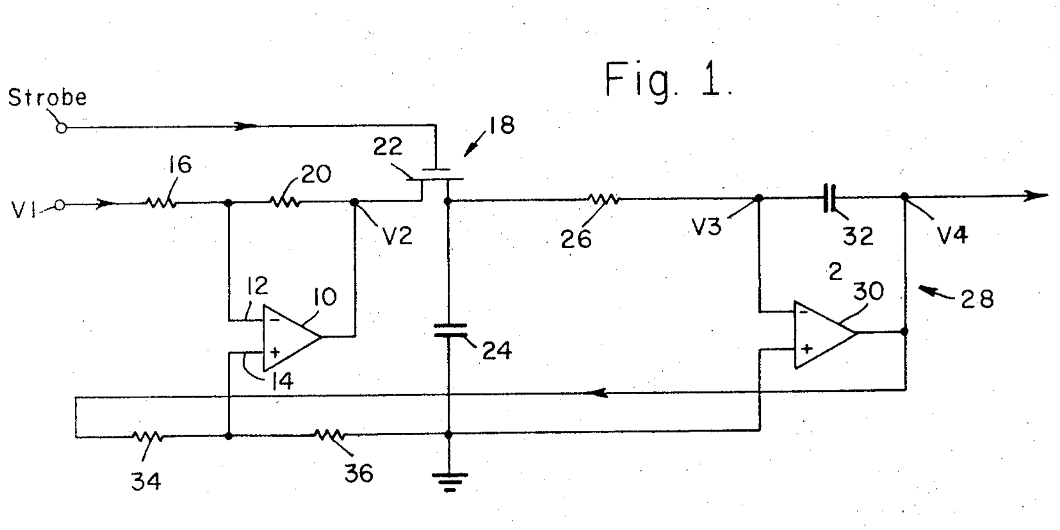
FIG. 1 is a schematic diagram of one preferred embodiment of a signal processor in accordance with the subject invention.

Reference is first primarily directed to the embodiment of the subject invention as shown in FIG. 1. The signal processor there shown includes a differential amplifier 10 having a first input circuit 12 adapted to receive applied signals V1 (see FIG. 5) and a second input circuit 14. The applied signal V1 is coupled to input circuit 12 through a resistor 16; and it is noted that in the embodiment of FIG. 1 input circuit 12 is the inverting input circuit of differential amplifier 10. The output signal V2 from differential amplifier 10 is applied to the input of a sample-and-hold circuit 18 and through a feedback resistor 20 to input circuit 12.

Sample-and-hold circuit 18 includes a field effect transistor 22, a capacitor 24 and a resistor 26. The source and drain terminals of transistor 22 are coupled between the output of differential amplifier 10 and capacitor 24 such that during the time intervals strobe or gating pulses (see waveform S of FIG. 5) are applied to the gate terminal of field effect transistor 22, the capacitor is charged to the level of the signal V2.

The output signal (V3) from sample-and-hold circuit 18 is applied to an inverting integrator indicated generally by reference numeral 28. Inverting integrator 28 includes a differential amplifier 30 which has its output terminal coupled through a feedback capacitor 32 to the inverting input circuit of differential amplifier 30. The output signal V4 from integrator 30 is applied through a resistor 34 to the non-inverting input 14 of differential amplifier 10; and a resistor 36 is coupled between input 14 and ground (a reference potential plane).

Figure 3:
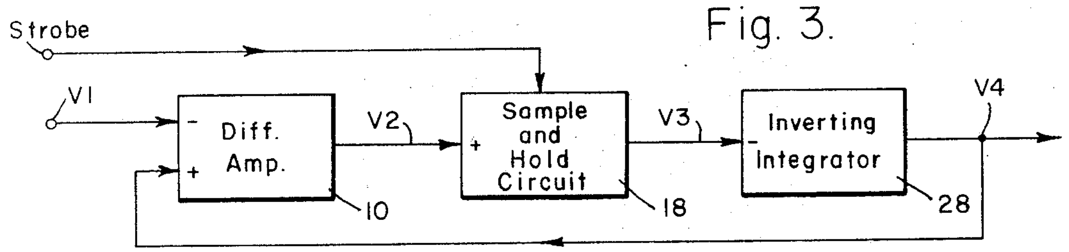
FIG. 3 is a block diagram of the processor of FIG. 1.

The signal processor of FIG. 1 is shown in block diagram form in FIG. 3.

Figure 2:
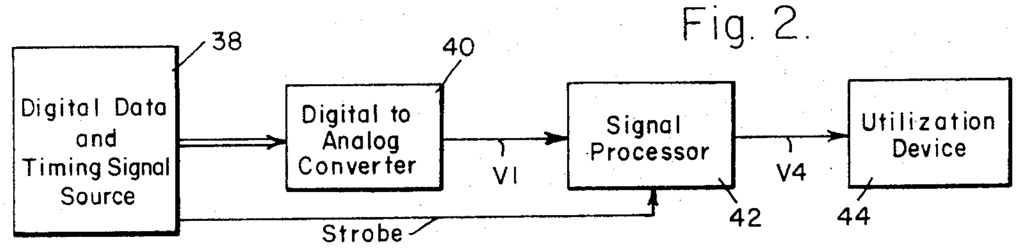
FIG. 2 is a block diagram of a data processing system which incorporates a signal processor in accordance with the subject invention.

Reference is now momentarily directed to FIG. 2 which depicts a system in which a signal processor in accordance with the subject invention could be utilized. As shown in FIG. 2, digital signals are applied from a digital data and timing signal source 38 to a digital-to-analog converter 40; and output signal V1 from digital-to-analog converter 40 is applied as an input signal to a signal processor 42 of the type shown in FIG. 1, 3, or 4. The output signal V4 from signal processor 42 is applied to a utilization device 44, such as a display unit, for example.

Digital data and timing signal source 38 could include, for example, a read only memory (ROM) and associated readout and timing control circuits as are well known in the art. For example, if an analog signal of the type shown by waveform 46 (FIG. 5) is desired it could be quantized and digital data corresponding to the various discrete levels of waveform V1 (see FIG. 5) stored in the read only memory. Then during operation of the system of FIG. 2 the read only memory would be interrogated under control of standard readout circuits to produce output signals which when converted to analog form provide the signal V1.

The strobe or gating pulses S (see FIG. 5) are also supplied from unit 38 and it is noted that these strobe pulses are timed to occur during the terminal portion of each pulse segment of the signal V1. One implementation for providing these strobe pulses (not shown) would be to process clock pulses which coincide with the level changes at the start of each pulse segment of the signal V1, through a fixed delay device. The fixed delay value would be equal to a time interval T, see FIG. 5, between the start of a pulse segment and the desired sampling point of the terminal portion of the same pulse segment.

Figure 4:
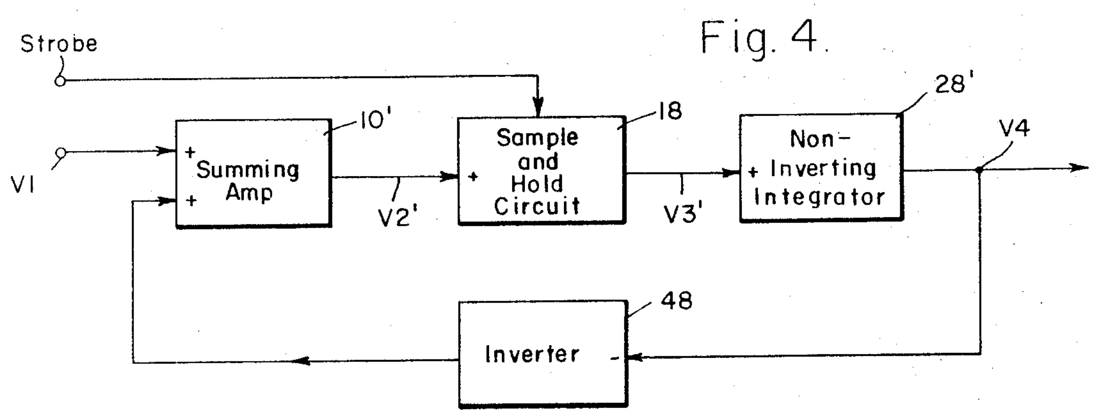
FIG. 4 is a block diagram of a second embodiment of a signal processor in accordance with the subject invention.

A second embodiment of the subject invention is shown in FIG. 4 as comprising a summing amplifier 10', a sample-and-hold circuit 18, a non-inverting integrator 28' and an inverter 48. The signal V1 is applied to one input circuit of summing amplifier 10'; and the output signal from summing amplifier 10' (V2') is sampled during the strobe pulse intervals by sample-and-hold circuit 18. The output signal V3' from sample-and-hold circuit 18 is integrated within non-inverting integrator 28' to provide the output signal V4. The signal V4 is inverted within inverter (unity gain, polarity inverting amplifier) 48 and applied to the other input circuit of summing amplifier 10'.

OPERATION

Figure 5:
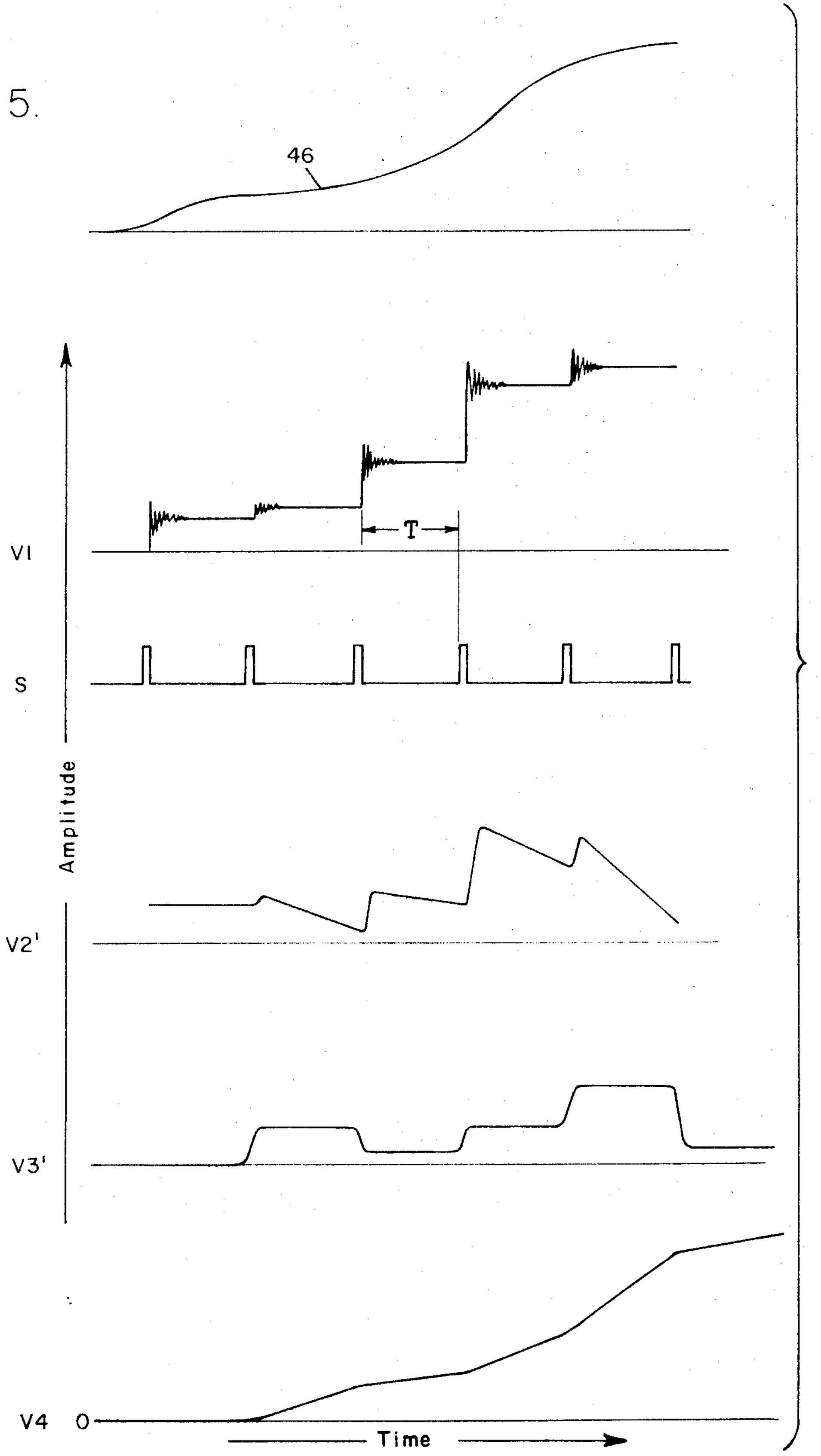
FIG. 5 is a diagram of signal amplitudes versus time which are useful for explaining the operation of signal processors in accordance with the invention.

Referring primarily to FIGS. 4 and 5 the operation of the subject invention will now be explained in greater detail. As shown in waveform S of FIG. 5, the strobe or gating signals have a predetermined fixed interpulse period and a duration which is substantially less than the interpulse period. The applied signal V1 is comprised of a sequence of contiguous pulses with each of said pulses having a duration equal to the period between the strobe or gating signals, a substantially uniform amplitude during the terminal portion of each pulse interval and with the amplitude of the respective pulses being representative of the information content of the signal V1. It is noted that the gating pulses and the pulses comprising that signal V1 are synchronized such that the gating pulses occur during the uniform amplitude terminal portion of the pulse segments of the signal V1. It is further noted that in accordance with the invention that by sampling the terminal portion of each pulse segment of the signal V1 the digital state transition noise which is present on the leading edge of each pulse segment is substantially eliminated in the output signal V4. This noise suppression is in addition to the reduction in the higher frequency components of the applied signal V1 due to the transformation of the step type transitions of the applied signal into ramp type transitions in the output signal V4.

If for the system of FIG. 2, a continuous (no abrupt level changes) analog signal such as waveform 46 of FIG. 5 is desired the analog signal could be sampled and the sample values digitally stored in unit 38. In accordance with this type of data processing technique, when the signal is required the unit 38 would have its stored data read out and applied to digital-to-analog converter 40 in such a manner that the output signal from the converter would be in accordance with the waveform V1 of FIG. 5. It should be noted that the signal V1 produced by the digital-to-analog converter has substantial noise energy at the leading edge of each pulse segment and step transitions are present between pulse segments. Such a signal is unacceptable in many applications; for example, if the signal V1 were applied as part of a deflection waveform to a display system it could result in undesirable granulation of the display presentation.

The signal processor of the subject invention processes the applied signal V1 to provide the filtered or smoothed signal V4 with only a single clock period delay introduced; with ramp type transitions, instead of step transitions between levels of the applied signal; and with leading edge noise on the pulses of the applied signal eliminated.

Again, referring primarily to FIGS. 4 and 5, the signal V1 is summed with the inverted signal V4 (applied through inverter 48) to produce the output signal V2' of amplifier 10'. It is noted that the signal V2' associated with the embodiment of FIG. 4 is of the same general waveform as the signal V2 associated with the embodiment of FIGS. 1 and 3 except that these signals have opposite polarities. Similarly the signal V3 = −V3'. Unit 18 (FIG. 4) samples the values of the signal V2' during the time periods of the gating or strobe pulses S and stores the sample values of the difference signal until the next subsequent sampling period. This sampled difference signal produced at the output circuit of sample-and-hold unit 18 (see waveform V3') is integrated by the non-inverted integrator 28' to produce the filtered or smoothed output signal V4.

Thus, there has been described a new and useful signal processor for filtering and/or smoothing applied signals. Although preferred embodiments of the subject invention have been described with particularity hereinabove, it is noted that many changes and/or modifications thereto may be made by those skilled in the art without departing from the scope of the subject invention. For example, integrators 28 and 28' could be replaced by multiple stage integrators so as to provide a higher order transition function for the change between levels than the ramp type transition illustrated hereinabove. For example, if two series coupled integrators were used a step transition between voltage levels in the input signal V1 would result in a parabolic type transition in the output signal V4.

What is claimed is:

1. A signal processor adapted for responding to gating signals of a predetermined fixed interpulse period and of a duration substantially less than said interpulse period; and to an applied signal consisting of a sequence of contiguous pulses with each of said pulses having a duration equal to the period between said gating pulses, a substantially uniform amplitude during a predetermined portion of each pulse interval and with the amplitudes of the respective pulses being representative of the information content of said applied signal and with said gating pulses and the pulses of said applied signal being synchronized such that said gating pulses occur during said uniform amplitude portions of said applied signal pulses, said processor being further adapted for converting said applied signal to an output signal which is a reproduction of said applied signal but with a reduction in higher frequency signal components which are characteristic of the amplitude transitions between pulses which comprise said applied signal; said signal processor comprising:

first means, having a first input circuit adapted for receiving said applied signal and a second input circuit and an output circuit, for providing at said output circuit a difference signal which is a function of the difference between the signals applied to its first and second input circuits;

sample-and-hold means, having a gate signal input circuit adapted to receive said gating signals, for sampling the value of said difference signal during the periods of application of said gating signals, for storing said sampled value between sampling operations and for providing a sampled difference output signal which is representative of said stored sampled value; and integrating means, having an input circuit and an output circuit, for integrating signals applied to its input circuit; said integrating means having its input circuit coupled to receive said sampled difference output signal, and its output circuit coupled to the second input circuit of said first means; whereby said output signal from said processor is provided at the output circuit of said integrating means.

2. The signal processor of claim 1 wherein said first means is a differential amplifier and said first and second input circuits of said first means are the inverting and non-inverting input circuits, respectively, of said differential amplifier; and said integrating means is an inverting integrator circuit.

3. The signal processor of claim 1 wherein said first means comprises a summing circuit having first and second input circuits; and an inverter having an output circuit coupled to the second input circuit of said summing circuit and an input circuit; and said first and second input circuits of said first means are the first input circuit of said summing circuit and the input circuit of said inverter, respectively; and said integrating means is a non-inverting integrator circuit.

4. The signal process of claim 1 wherein said sample-and-hold means includes a capacitor; and a field effect transistor having its source and drain terminals coupled between the output of said first means and said capacitor element such that said capacitor element is charged from said first means during period said gating signals are applied to the gate terminal of said field effect transistor.

* * * * *